United States Patent
Puyo et al.

[15] 3,659,464
[45] May 2, 1972

[54] MECHANICAL VIBRATOR

[72] Inventors: Andre Jean-Marie Puyo; Pierre Andre Habib, both of Paris, France

[73] Assignee: James L. Sherard, Berkeley, Calif.

[22] Filed: Apr. 21, 1970

[21] Appl. No.: 30,541

[52] U.S. Cl. ............................................................ 74/61
[51] Int. Cl. ................................................... F16h 33/00
[58] Field of Search .................... 74/61, 56, 437, 559.5, 423, 74/804, 805; 259/1; 198/220 D

[56] References Cited

UNITED STATES PATENTS

| 70,970 | 11/1867 | Cunningham | 74/423 |
|---|---|---|---|
| 2,211,741 | 8/1940 | Elwell | 74/56 |
| 1,281,734 | 10/1918 | Wingovist | 74/459.5 |
| 2,874,594 | 2/1959 | Sundt | 74/805 |
| 3,374,685 | 3/1968 | Eheim | 74/56 |

Primary Examiner—William F. O'Dea
Assistant Examiner—Wesley S. Ratliff, Jr.
Attorney—Owen, Wickersham & Erickson

[57] ABSTRACT

A vibrator apparatus with rotating components, comprising rolling elements in the shape of cones of revolution distributed around a construction axis with their vertices directed toward this axis and their own geometrical axes meeting this construction axis. The cones are in contact with at least one conical surface whose vertex coincides with the common point at which the vertices of the roller axes meets and centered around this construction axis. The roller cones are made to roll in contact with this conical surface to produce a rolling movement that engenders the planetary rotation of the cones and a periodic displacement of the mass of the cones parallel to the construction axis.

10 Claims, 8 Drawing Figures

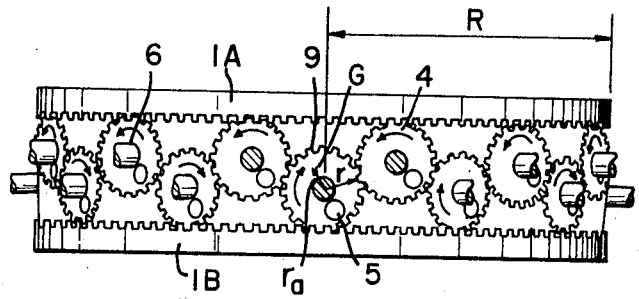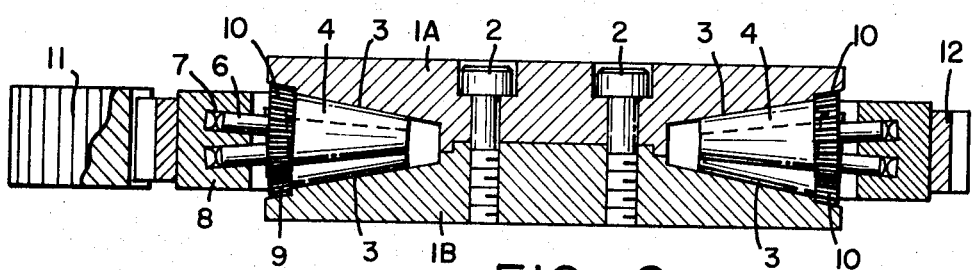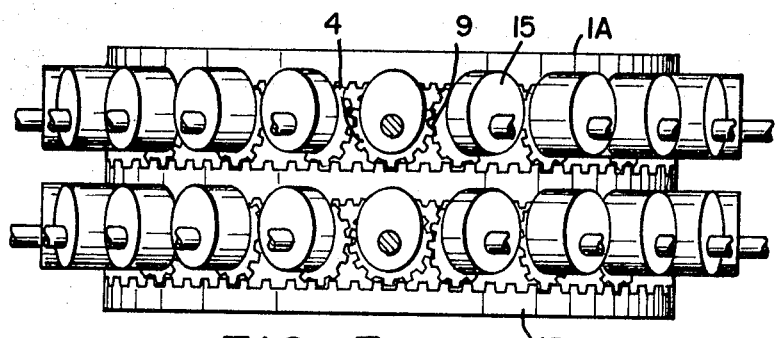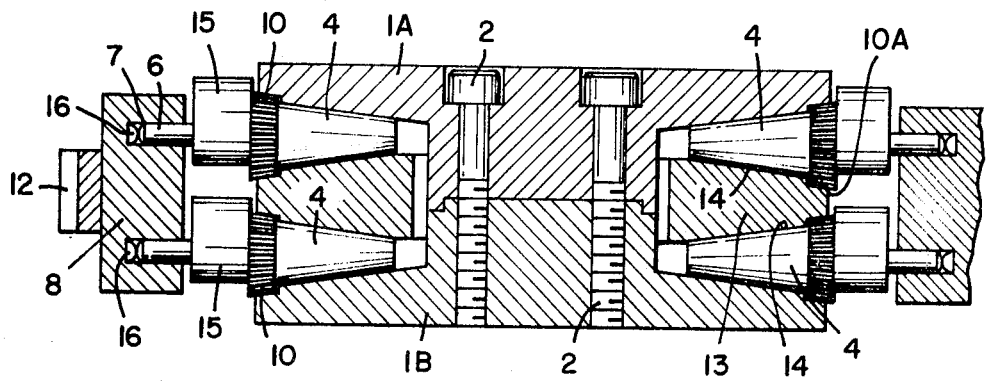

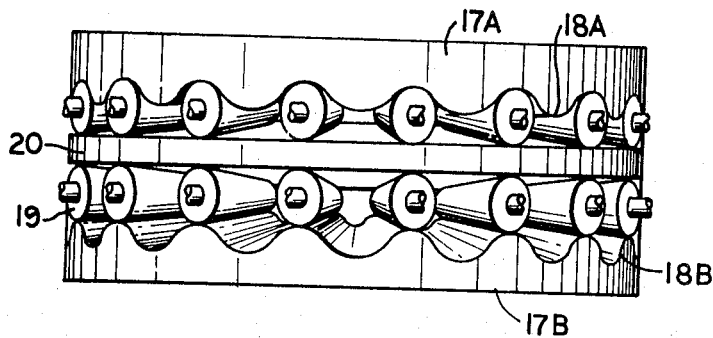
FIG_5
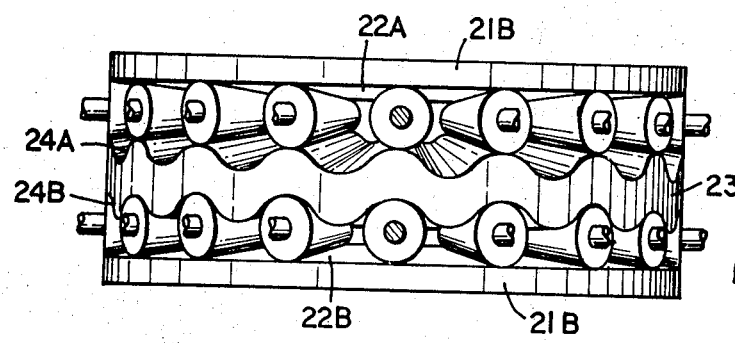
FIG_6
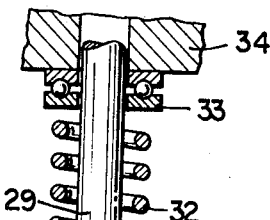
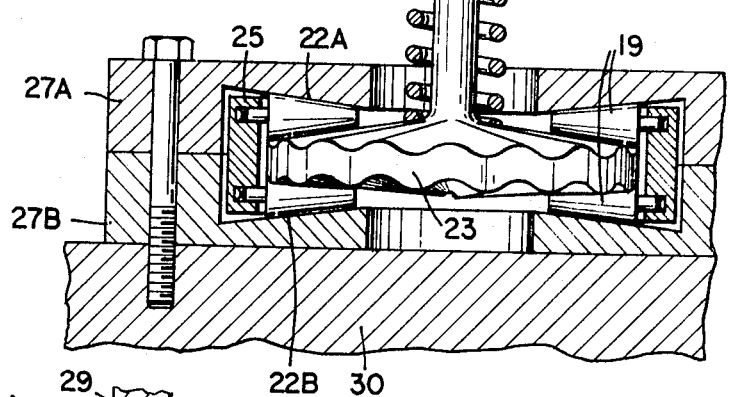
FIG_8
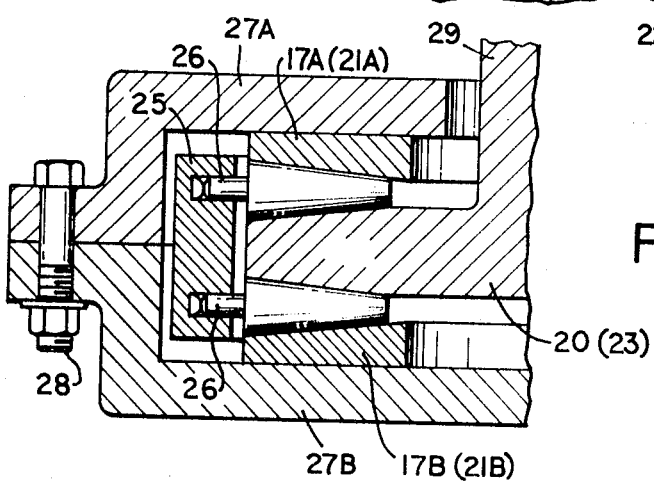
FIG_7
INVENTOR.
ANDRÉ JEAN-MARIE PUYO
PIERRE ANDRÉ HABIB
BY
ATTORNEYS

MECHANICAL VIBRATOR

This invention relates to a mechanical vibrator for providing high frequency vibration and thus high acceleration.

Mechanical vibrators normally consist of eccentric rotating elements and in general their frequency of vibration is dependent on the number of revolutions per second of the driving motor.

In vibrators heretofore devised the spindles of the rotating elements were supported in bearings and both spindles and bearings were subjected to alternate bending loads which were extremely harmful and prejudicial to their long life. Moreover, as these elements were driven by a transmission shaft parallel to their axis of rotation, the direction of vibration obtained was perpendicular to this shaft. This caused serious handicaps in mounting the vibrator.

This invention overcomes these disadvantages.

Loads and reactions engendered by the forced oscillation provided by the vibrator are supported as compressive stresses acting along the generatrices that are traced by the rotating elements which rotate in contact with each other, without these elements being subjected to alternating bending stresses.

This invention provides vibrations parallel to the transmission shaft.

Moreover, one of its most important advantages is that it can provide high frequency vibration using motors whose speed is relatively low.

A vibrator embodying the principles of the present invention is characterized by having several roller elements, in the form of conical rollers, arranged around a construction axis. The vertices of these rollers point towards this axis and their own geometrical axes crossing this axis. These conical rollers are in contact with at least one conical surface whose vertex is coincident with the point at which the axes of the rollers meet and this vertex is centered on the construction axis. The rollers roll on this conical surface causing both planetary rotation of the cones and, most important, a periodic movement of one part of the mass of the apparatus parallel to the construction axis. This vibrating mass can be supplied by the conical rollers or by an intermediate runner, whose faces act as roller paths. The conical rollers are preferably held between two conical surfaces which are prevented from moving apart, so that stresses in the direction of the construction axis are transmitted only as compressive stresses.

One embodiment of our invention comprises an arrangement wherein the two outer conical surfaces form a single component, between which are at least two sets of conical surfaces, while between any two consecutive sets of rollers is interposed a runner that rotates relative to the first conical surfaces and whose faces are conical surfaces on which the rollers run.

In one embodiment of the invention, the mass of the conical rollers is unbalanced and the conical surfaces revolve around the construction axis. In this case, forced oscillation results from the movement of the centers of gravity of the rollers around their individual axes.

In another embodiment, the rollers are homogeneous and at least one of the conical surfaces with which one of the sets of rollers is in contact, is an undulating surface, the peaks and troughs of the undulations radiating outwards from the center. In other words, the generatrices of these conical surfaces pass through the axis of the vibrator, being guided by a closed-curve undulating directrice. In this case, as the centers of gravity of the rollers lie on their axes, the movement of forced oscillation results from the displacement of the axes of these rollers. In this way, the mass of the runner, or of the runner and rollers, can be made to move in an alternating axial direction.

Vibrators of the type covered by this invention are capable of providing vibrations of very much high frequency than the speed of rotation of the transmission shaft. Thus, with a motor having a speed of 3,000 rpm, it is easily possible to obtain vibrations of 3,000 periods per minute, i.e. 500 cps, without the energy losses nor complications of step-up gearing.

Another advantage of the present invention is that there are no vibrating components other than those vibrating in the direction of the axis of rotation.

Depending on the uses for which it is designed, our vibrator can be driven internally or externally, i.e. through a drive shaft orientated along the axis of rotation or through a lateral transmission shaft with a gear wheel meshing with a toothed runner carried by one of the elements of the instrument rotating around the axis of rotation.

Thus, our vibrator can be mounted inside or outside the object to be vibrated.

Moreover, the apparent mass of the vibrator can be easily increased by the use of elastic elements forcing the vibrator against the object to be vibrated.

Other objects and advantages of our invention will become apparent from the following detailed description taken with the appended drawings which illustrate non-limiting examples of models of this invention.

FIG. 1 is a view in elevation showing the internal arrangement of one vibrator embodying the principles of the present invention;

FIG. 2 is an enlarged view in section taken through the center line of the vibrator in FIG. 1;

FIG. 3 is a view in elevation showing the internal arrangement of a second embodiment of a vibrator according to our invention;

FIG. 4 is a view in section taken through the center line of the vibrators of FIG. 3;

FIGS. 5 and 6 are views in elevation showing the internal arrangement of third and fourth embodiments of vibrators embodying the principles of our invention;

FIG. 7 is an enlarged fragmentary view in section taken through the center line of a vibrator of the type shown in FIGS. 5 and 6;

FIG. 8 is a view in elevation and in section showing the method of mounting a vibrator according to our invention.

In the embodiment of our invention shown in FIGS. 1 and 2, two end plates 1A and 1B, whose internal faces 3 have the shape of a truncated cone and which are held in place by bolts 2, enclose two sets of truncated conical rollers 4. Each roller of each set runs on the inside face of one of these plates. Each roller has an eccentric hole 5 which unbalances its center of gravity and a pin 6 projecting from its base. These pins 6 engage in holes 7 of a ring 8 which encloses the whole assembly. The axes of the rollers 4 meet the center line X—X at the common vertex of the two truncated conical surfaces 3.

In order to maintain the rollers 4 which are unbalanced due to the presence of the holes 5, in phase, i.e. to maintain their relative radial orientation with reference to their individual axes, they are equipped with teeth 9 meshing with one of the sets of conical teeth around the rim of plates 1A and 1B. As these teeth serve only to synchronize the rollers, they are subjected to low stresses only and can therefore be of simple design.

When the ring 8 is driven by the pinion 11 which engages the teeth 12 on this ring, the toothed conical rollers 4 which mesh with the end plates 1A and 1B are caused to rotate around the center line of the vibrator, and their eccentric centers of gravity rotate around the individual roller axes.

If the ring 8 rotates around the center line X—X with a speed $\Omega$ each roller rotates around its own axis with a speed $\omega = (\Omega \times R)/r$.

With rollers of small conicity, the relationship $R/r$ can be as high as, and even exceed, 10.

If G is the center of gravity of one of the rollers at a distance $r_a$ from the roller axis, the amplitude of vibration obtained will evidently be equal to $2 r_a$.

In the embodiment of FIGS. 1 and 2, the ring 8 serves both to drive the rollers and maintain them in place against centrifugal force.

In the embodiment shown in FIGS. 3 and 4, the vibrator comprises two sets of rollers 4 between end plates 1A and 1B and an intermediary runner 13 between the two sets. The surface 14 of the upper and lower faces of this runner have, like the end plates, the shape of a truncated cone. As before, the vertices of any two truncated conical surfaces opposite each other meet at a point.

This embodiment differs from that shown in FIGS. 1 and 2 in that the mass of the rollers is rendered eccentric by the addition to the outer face of the rollers of an eccentric weight 15. As before, to resist centrifugal forces and to maintain the spacing between rollers, the ends of pins 6 rest on rounded studs 16 at the bottom of holes 7.

In the embodiment shown in FIG. 4, as in that shown in FIG. 2, the rollers can be driven through the ring 8 by means of the teeth 12. The drive can also be transmitted through the runner 13 which, in this case, can advantageously be fitted with teeth 10a around its rim meshing with the teeth 10. In this case, ring 8 is replaced by two separate rings, leaving a space between them for the driving mechanism. It should be noted that for the same angular velocity of the driving runner 13 and the driving ring 8, oscillation frequency is double in the second case as compared with the first.

It is also possible to obtain vibrations, still orientated along the center line of the vibrator, by means of balanced rollers, the spindles of these rollers being made to follow an oscillating path. In this case, a component, which can have high mass, resting on the rollers, is itself forced to vibrate at the frequency imposed on these rollers.

FIGS. 5 and 6 show two embodiments of a vibrator of this type. In the case shown in FIG. 5, the end plates 17A and 17B have undulating roller paths 18A and 18B, the undulations being directed radially outwards from the center, and their profile being sinusoidal. The rollers 19 are homogeneous. They run on these roller paths, as well as on a central runner 20 whose two faces are truncated cones.

In the vibrator shown in FIG. 6, the end plates 21A and 21B have truncated conical roller paths 22A and 22B, whereas the central runner 23 has sinusoidal roller paths 24A and 24B on both faces.

As before, the pins 26 at the base of each roller engage in an outside ring 25 maintaining the rollers in place and resisting centrifugal forces.

In the vibrator shown in FIG. 7, the plates 17A and 17B (or 21A and 21B) are fixed and form a single unit by virtue of a casing made in two parts 27A and 27B assembled with bolts 28. In this case, the vibrator is driven through the central runner 20 (or 23) which is driven by a transmission shaft 29.

In this vibrator, the object to be vibrated can be joined to the casing 27A - 27B, the motor driving the vibrator through the shaft 29. Inversely, the object to be vibrated can be joined to the shaft 29, and drive transmitted by rotating the casing 27A - 27B by means of the ring 28 as shown.

If, however, the casing 27A - 27B is fixed rigidly to a very heavy mass or to a fixed member, shaft 29 is then both the drive shaft and the component transmitting the vibrations to the object to be vibrated. An example of such a model is shown in FIG. 8.

For the vibrators shown in FIGS. 5 and 6, frequency N is approximately equal to $np/2$ where the rotation of the plates in relation to the runner is $n$ revs per second and the number of sine waves is $p$.

In the case shown in FIG. 5, frequency N is slightly below $np/2$.

In the case shown in FIG. 6, frequency N is slightly above $np/2$. This variation with reference to $np/2$ is due to the difference in length between the developed length of the sine curve and of the cone of revolution.

For example, if the plates or the runner have 20 waves, frequency N will be 10 times greater than the number of revs per second of the driving runner or plates.

On FIG. 8, the object to be vibrated 30 is fixed solidly by bolts 31 to the casing 27 which incorporates the roller paths 22A and 22B. The central runner 23 is driven, as before, by the shaft 29. The vibrations of the runner are transmitted to the object to be vibrated 30 through the rollers 19. A spring 32 backs upon a rigid member 34 or possibly upon a member of very large mass, i.e. much larger than the object to be vibrated 30. A thrust ball bearing 33 is interposed between the spring and this rigid member.

Shaft 29 rotates driving rollers 19 and the vibration of the runner 23 is transmitted by these rollers to the casing 27 and the object 30.

In this embodiment, the thrust of the spring 32 varies periodically with its elongation, and is algebraically added at each moment to the acceleration to which the runner 23 is subjected. If the load applied by the spring is greater than the force of acceleration, the vibration is transformed into a simple variation of the magnitude of the thrust applied to the object 30, which always has the same sign.

It can be shown that if the aggregate mass of the runner 23 and the shaft 29 is 10 kg, the amplitude of vibration 5 mm and the speed or rotation 3,000 rpm, a vibration frequency of 500 cps is obtained if the sinusoidal roller paths have 20 complete waves per revolution. By reason of this high frequency and the relatively high amplitude of the movement, the peak value of acceleration reaches 50 tons. This load can be supported by 20 rollers, 4 cm long and 2 cm mean diameter, the metal then working at a maximum stress of 50 kg.mm$^2$.

In the models shown in FIGS. 5 and 6, the undulations of the conical rolling surfaces have a sinusoidal profile, so that acceleration is of the same magnitude in both directions along the construction axis X—X. There are advantages in choosing an assymmetrical pattern, i.e. where the slope in one direction along the axis is, for example, greater than in the other. In this way higher acceleration is obtained in one direction than in the other, which is often useful for applications other than compacting granular media masses, especially for driving piles.

Our vibrator has the same applications as normal vibrators. Nevertheless, by reason of the axial direction of vibration obtained and the intensity of the vibration load, the field of application can be widened for vibrators of this type. For example, they can be applied to fatigue tests on samples of various materials, to machining with rotating machine tools such as lathes, milling machines, drills and reamers, by applying axial vibrations to the rotating part of the tool during machining, to compaction of materials with high internal friction coefficients such as sand, and to pile driving and drilling.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A vibrator apparatus comprising a plurality of rolling elements in the shape of cones of revolution distributed around a construction axis with their vertices directed towards this axis and their own geometrical axes meeting said construction axis;
    first means centered around said construction axis and forming at least one conical surface whose vertex coincides with the common point at which the vertices of the roller axes meet;
    said cones being in contact with said surface;
    second means causing said cones to roll in contact with said conical surface to produce a rolling movement engendering the planetary rotation of the cones and a periodic displacement of the mass of the cones in a direction parallel to said construction axis.

2. A vibrator apparatus as described in claim 1 wherein said first means includes a pair of end members forming two conical surfaces, said cones being held between said two conical surfaces which are prevented from moving apart.

3. A vibrator apparatus as described in claim 2 wherein said two conical surfaces form a single unit with at least two sets of cones between them, the outer sets being in contact with these conical surfaces, while between two consecutive sets of cones is interposed a runner rotatable in relation to the first conical surfaces in contact with these cones as they roll.

4. A vibrator apparatus as described in claim 1 wherein the mass of the revolving cones is unbalanced and the conical surfaces being cones of revolution.

5. A vibrator apparatus as described in claim 2 wherein said cones are homogeneous about their axes, and wherein at least one of said two conical surfaces with which one set of cones is in contact is a closed-curve undulating directrice centered on the construction axis.

6. A vibrator apparatus as described in claim 1 including a ring member around said first means, wherein said cones have at their outer face an axial pin engaging in a blind hole drilled in said ring member enclosing at least one set of cones.

7. A vibrator apparatus as described in claim 6 including means at the periphery of said ring member forming a driving element of the vibrator, and means for fixing the end conical surfaces together internally.

8. A vibrator apparatus as described in claim 3, wherein said end conical surfaces form a single unit by being fixed together externally and an intermediary rotatable runner driven from inside providing means for transmitting drive to the vibrator.

9. A vibrator apparatus as described in claim 8 wherein said end conical surfaces form a casing fixed to the object to be vibrated, and elastic means for rotating said runner and forcing it in the direction of the object to be vibrated.

10. A vibrator apparatus as described in claim 5 wherein the profile of the undulations of the directrice are assymetrical.

* * * * *